US012659539B2

(12) United States Patent
Wang

(10) Patent No.: US 12,659,539 B2
(45) Date of Patent: Jun. 16, 2026

(54) AUDIO AND VIDEO SYNCHRONIZATION METHOD AND APPARATUS, STORAGE MEDIUM, AND ELECTRONIC DEVICE

(71) Applicant: BOE TECHNOLOGY GROUP CO., LTD., Beijing (CN)

(72) Inventor: Kaifan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/705,461

(22) PCT Filed: Oct. 27, 2021

(86) PCT No.: PCT/CN2021/126734
§ 371 (c)(1),
(2) Date: Apr. 26, 2024

(87) PCT Pub. No.: WO2023/070374
PCT Pub. Date: May 4, 2023

(65) Prior Publication Data
US 2025/0240478 A1 Jul. 24, 2025

(51) Int. Cl.
*H04N 21/43* (2011.01)

(52) U.S. Cl.
CPC .............................. *H04N 21/43076* (2020.08)

(58) Field of Classification Search
None
See application file for complete search history.

(56) References Cited

U.S. PATENT DOCUMENTS 11,533,531 B1 * 12/2022 Link .................. H04N 21/4302
2009/0276821 A1 * 11/2009 Amento ........... H04N 21/44226
725/116

(Continued)

FOREIGN PATENT DOCUMENTS

CN 103209360 A 7/2013
CN 104244027 A 12/2014

(Continued)

OTHER PUBLICATIONS

International Search Report of PCT application No. PCT/CN2021/126734 dated Jun. 29, 2022.

(Continued)

*Primary Examiner* — William J Kim
(74) *Attorney, Agent, or Firm* — Calfee, Halter & Griswold LLP

(57) ABSTRACT

A method and a device for synchronizing audio/video, and a storage medium are provided. The method includes: determining target audio/video data, the target audio/video data being configured to be synchronously played by a master play device and a slave play device; determining a first reception time at which a first master-to-slave signal is received and a second reception time at which a second master-to-slave signal is received, the first master-to-slave signal and the second master-to-slave signal both being transmitted by the master play device to the slave play device; calculating a modification time based on the first reception time and the second reception time, and modifying a time of the slave play device based on the modification time; and synchronously changing a playing status of the target audio/video data between the master play device and the slave play device based on the modification time.

18 Claims, 14 Drawing Sheets

(56)  References Cited

U.S. PATENT DOCUMENTS

| | | | | | |
|---|---|---|---|---|---|
| 2014/0323036 A1* | 10/2014 | Daley | .................... | H04H 20/38 | |
| | | | | 455/3.06 | |
| 2015/0334335 A1* | 11/2015 | White | ............... | H04N 21/4222 | |
| | | | | 348/734 | |
| 2018/0310042 A1* | 10/2018 | Mayalil | ............ | H04N 21/41407 | |
| 2021/0044845 A1* | 2/2021 | Bertolami | .............. | H04L 65/60 | |
| 2023/0052385 A1* | 2/2023 | Shah | .................. | H04N 21/2401 | |

FOREIGN PATENT DOCUMENTS

| | | | | | |
|---|---|---|---|---|---|
| CN | 104853239 A | 8/2015 | | | |
| CN | 105392040 A | 3/2016 | | | |
| CN | 105898502 A | 8/2016 | | | |
| CN | 106911950 A | 6/2017 | | | |
| CN | 108269442 A | 7/2018 | | | |
| CN | 108449630 A | 8/2018 | | | |
| CN | 108540829 A | 9/2018 | | | |
| CN | 109218795 A | 1/2019 | | | |
| CN | 112684992 A | 4/2021 | | | |
| KR | 20190118002 A | * | 10/2019 | ........... | H04N 21/436 |
| WO | WO-2019134859 A1 | * | 7/2019 | ......... | H04N 21/4302 |

OTHER PUBLICATIONS

Written Opinion of PCT application No. PCT/CN2021/126734 dated Jun. 29, 2022.

First Office Action of CN application No. 202180003121X dated Mar. 25, 2025.

\* cited by examiner

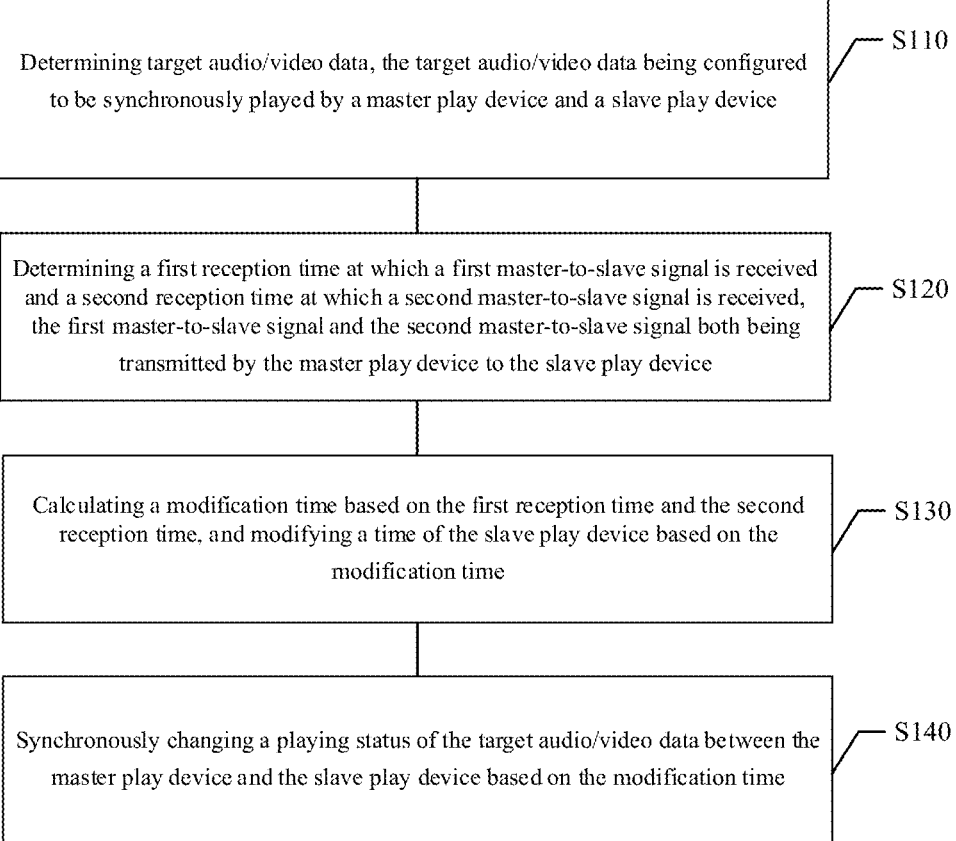

Determining target audio/video data, the target audio/video data being configured to be synchronously played by a master play device and a slave play device —— S110

Determining a first reception time at which a first master-to-slave signal is received and a second reception time at which a second master-to-slave signal is received, the first master-to-slave signal and the second master-to-slave signal both being transmitted by the master play device to the slave play device —— S120

Calculating a modification time based on the first reception time and the second reception time, and modifying a time of the slave play device based on the modification time —— S130

Synchronously changing a playing status of the target audio/video data between the master play device and the slave play device based on the modification time —— S140

FIG. 1

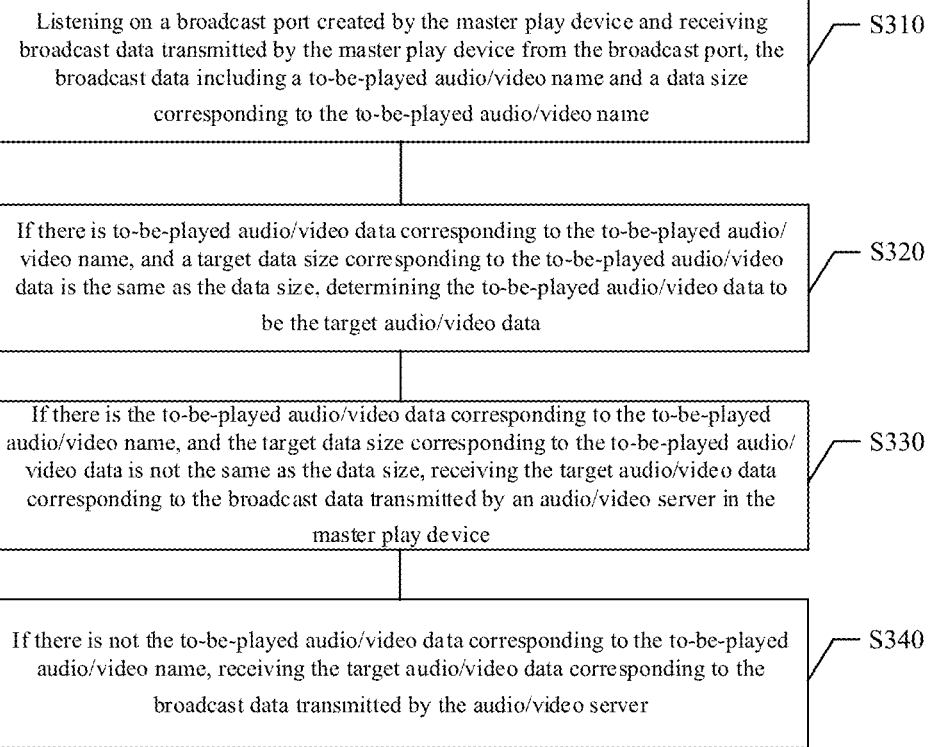

Listening on a broadcast port created by the master play device and receiving broadcast data transmitted by the master play device from the broadcast port, the broadcast data including a to-be-played audio/video name and a data size corresponding to the to-be-played audio/video name — S310

If there is to-be-played audio/video data corresponding to the to-be-played audio/video name, and a target data size corresponding to the to-be-played audio/video data is the same as the data size, determining the to-be-played audio/video data to be the target audio/video data — S320

If there is the to-be-played audio/video data corresponding to the to-be-played audio/video name, and the target data size corresponding to the to-be-played audio/video data is not the same as the data size, receiving the target audio/video data corresponding to the broadcast data transmitted by an audio/video server in the master play device — S330

If there is not the to-be-played audio/video data corresponding to the to-be-played audio/video name, receiving the target audio/video data corresponding to the broadcast data transmitted by the audio/video server — S340

FIG. 3

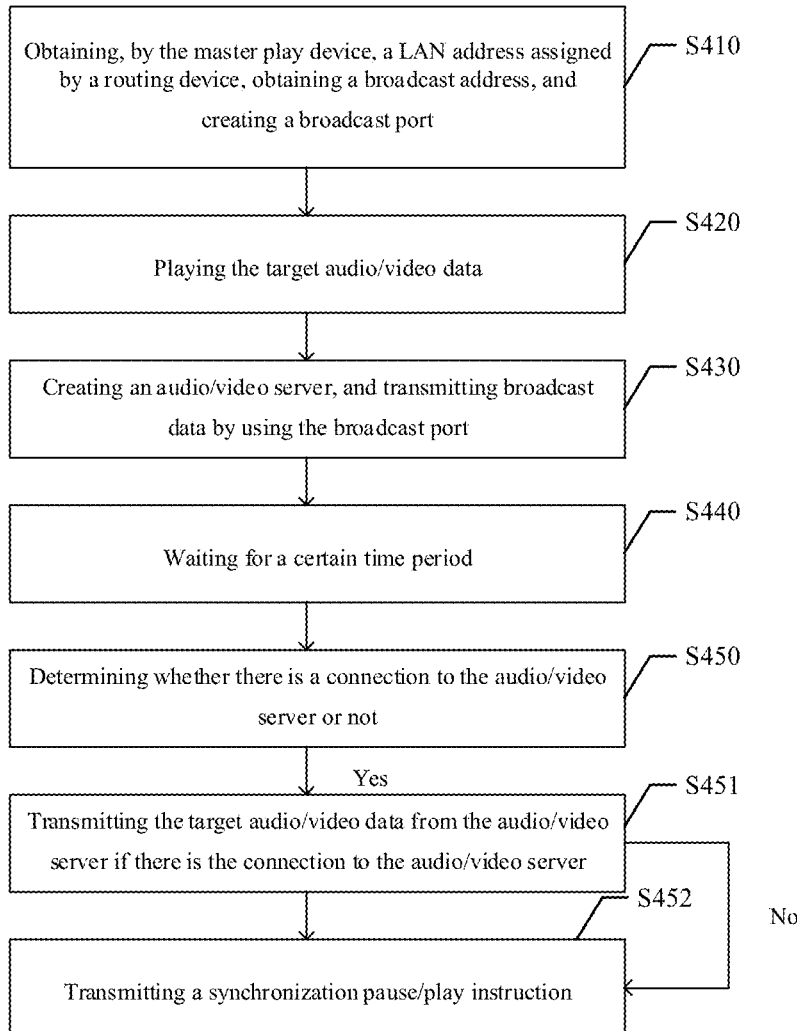

Obtaining, by the master play device, a LAN address assigned by a routing device, obtaining a broadcast address, and creating a broadcast port ⟋— S410

Playing the target audio/video data ⟋— S420

Creating an audio/video server, and transmitting broadcast data by using the broadcast port ⟋— S430

Waiting for a certain time period ⟋— S440

Determining whether there is a connection to the audio/video server or not ⟋— S450

Yes ⟋— S451

Transmitting the target audio/video data from the audio/video server if there is the connection to the audio/video server ⟋— S452        No Transmitting a synchronization pause/play instruction

FIG. 4

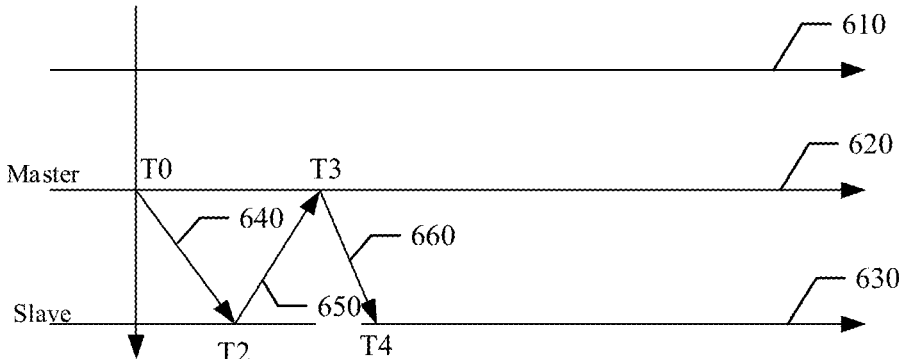

Master

T0  T3

610

620

640

660

Slave

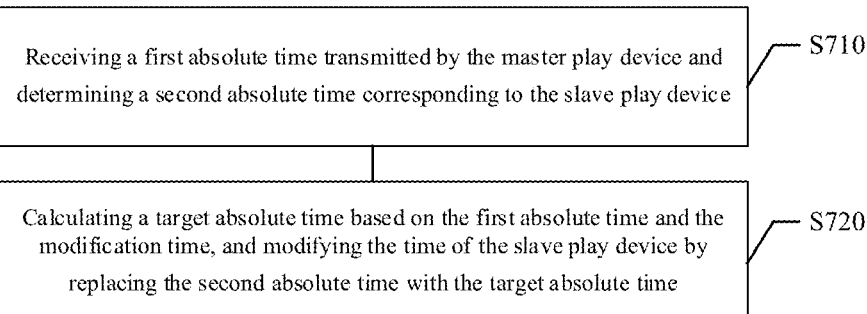

Receiving a first absolute time transmitted by the master play device and determining a second absolute time corresponding to the slave play device   S710

Calculating a target absolute time based on the first absolute time and the modification time, and modifying the time of the slave play device by replacing the second absolute time with the target absolute time   S720

FIG. 7

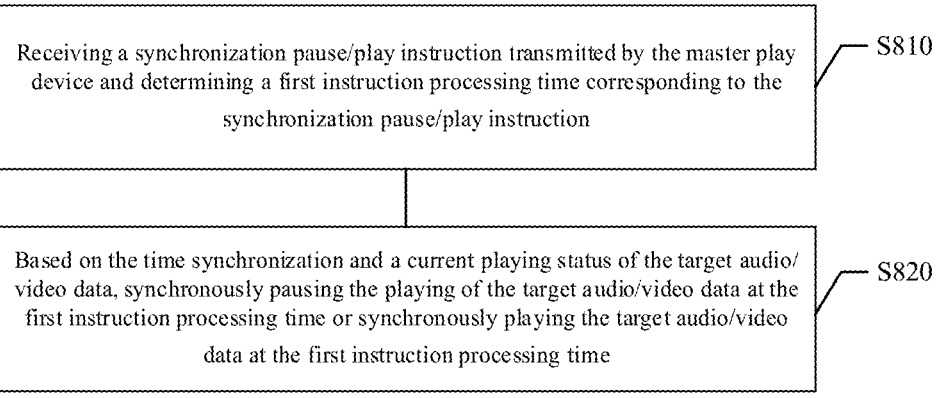

Receiving a synchronization pause/play instruction transmitted by the master play device and determining a first instruction processing time corresponding to the synchronization pause/play instruction — S810

Based on the time synchronization and a current playing status of the target audio/video data, synchronously pausing the playing of the target audio/video data at the first instruction processing time or synchronously playing the target audio/video data at the first instruction processing time — S820

FIG. 8

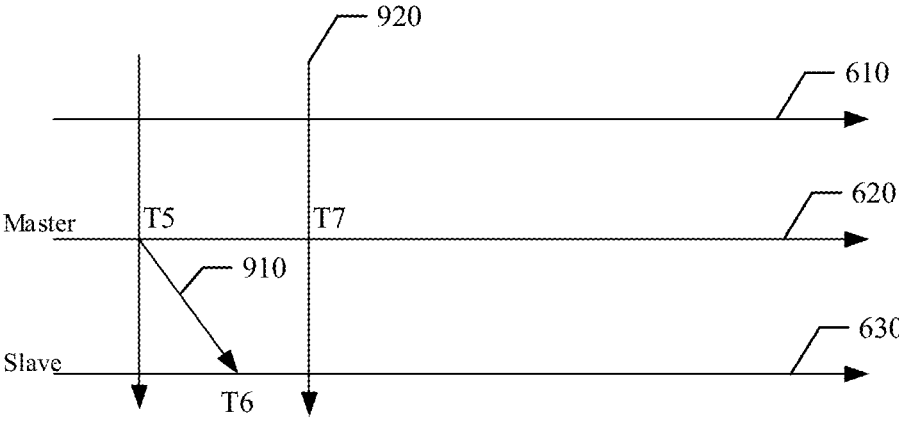

FIG. 9

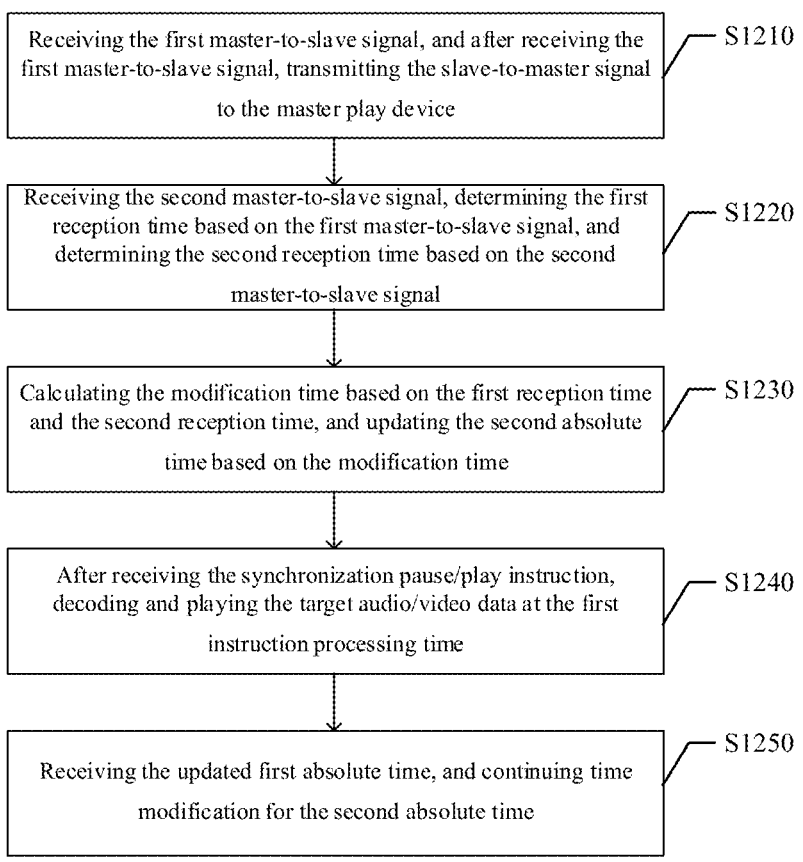

Receiving the first master-to-slave signal, and after receiving the first master-to-slave signal, transmitting the slave-to-master signal to the master play device ⟋ S1210

Receiving the second master-to-slave signal, determining the first reception time based on the first master-to-slave signal, and determining the second reception time based on the second master-to-slave signal ⟋ S1220

Calculating the modification time based on the first reception time and the second reception time, and updating the second absolute time based on the modification time ⟋ S1230

After receiving the synchronization pause/play instruction, decoding and playing the target audio/video data at the first instruction processing time ⟋ S1240

Receiving the updated first absolute time, and continuing time modification for the second absolute time ⟋ S1250

FIG. 12

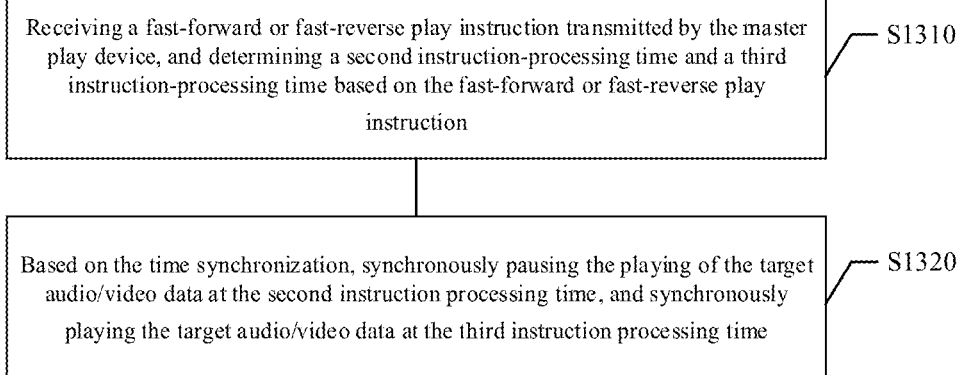

Receiving a fast-forward or fast-reverse play instruction transmitted by the master play device, and determining a second instruction-processing time and a third instruction-processing time based on the fast-forward or fast-reverse play instruction ⟋ S1310

Based on the time synchronization, synchronously pausing the playing of the target audio/video data at the second instruction processing time, and synchronously playing the target audio/video data at the third instruction processing time ⟋ S1320

FIG. 13

AUDIO AND VIDEO SYNCHRONIZATION METHOD AND APPARATUS, STORAGE MEDIUM, AND ELECTRONIC DEVICE

CROSS-REFERENCE TO RELATED APPLICATIONS

The present application is a U.S. National Stage of International Application No PCT/CN2021/126734 filed on Oct. 27, 2021, the entire contents of which are incorporated herein by reference.

TECHNICAL FIELD

The present disclosure relates to the field of audio/video technology, and in particular, to a method and a device for synchronizing audio/video, a non-volatile computer-readable storage medium and an electronic device.

BACKGROUND

With the development of audio/video technology, in more audio/video application scenarios, a same audio/video needs to be synchronously played the in a plurality of devices to increase the number of viewers watching the audio/video, and to enhance the play effect of the audio/video.

In the related art, when a same audio/video is transmitted to a plurality of devices at the same time, the audio/video may be not played synchronously, resulting in a poor audio/video viewing experience. Especially in a splicing screen, the audio/video received is an audio/video obtained by splitting an original audio/video, and upon being played, the split audio/video needs to be re-decoded, which reduces the synchronization of the same audio/video played on the splicing screens, and thus increases the jaggedness of the audio/video picture and further reduces the viewing experience of the user.

It is to be noted that the information disclosed in the above background section is only used to enhance the understanding of the background of the present disclosure, and thus may include information that does not constitute the prior art known to a person skilled in the art.

SUMMARY

Other features and advantages of the present disclosure will become apparent by the following detailed description, or will be acquired in part by the practice of the present disclosure.

A first aspect of embodiments of the present disclosure provides a method for synchronizing audio/video, including: determining target audio/video data, the target audio/video data being configured to be synchronously played by a master play device and a slave play device; determining a first reception time at which a first master-to-slave signal is received and a second reception time at which a second master-to-slave signal is received, the first master-to-slave signal and the second master-to-slave signal both being transmitted by the master play device to the slave play device; calculating a modification time based on the first reception time and the second reception time, and modifying a time of the slave play device based on the modification time; and synchronously changing a playing status of the target audio/video data between the master play device and the slave play device based on the modification time.

In an embodiment of the present disclosure, the method further includes, before determining the second reception time at which the second master-to-slave signal is received: transmitting a slave-to-master signal to the master play device and receiving the second master-to-slave signal transmitted by the master play device to determine the second reception time at which the second master-to-slave signal is received, wherein the slave-to-master signal is transmitted by the slave play device after receiving the first master-to-slave signal, and the second master-to-slave signal is transmitted by the master play device after receiving the slave-to-master signal.

In an embodiment of the present disclosure, calculating the modification time based on the first reception time and the second reception time includes: obtaining a modification time calculation formula, and calculating the modification time based on the first reception time and the second reception time by using the modification time calculation formula.

In an embodiment of the present disclosure, modifying the time of the slave play device based on the modification time includes: receiving a first absolute time transmitted by the master play device and determining a second absolute time corresponding to the slave play device; and calculating a target absolute time based on the first absolute time and the modification time, and modifying the time of the slave play device by replacing the second absolute time with the target absolute time.

In an embodiment of the present disclosure, synchronously changing the playing status of the target audio/video data between the master play device and the slave play device, the method includes: obtaining a third absolute time transmitted by the master play device, and obtaining a calculation result based on the third absolute time and the modification time, the third absolute time being obtained by updating the first absolute time; and updating the target absolute time based on the calculation result, and modifying the time of the slave play device by replacing the second absolute time with the updated target absolute time.

In an embodiment of the present disclosure, synchronously changing the playing status of the target audio/video data between the master play device and the slave play device based on the modification time includes: receiving a synchronization pause/play instruction transmitted by the master play device and determining a first instruction processing time corresponding to the synchronization pause/play instruction; and synchronously pausing the playing of the target audio/video data or synchronously playing the target audio/video data at the first instruction processing time based on the modification time and a current playing status of the target audio/video data.

In an embodiment of the present disclosure, synchronously changing the playing status of the target audio/video data between the master play device and the slave play device based on the modification time includes: receiving a fast-forward or fast-reverse play instruction transmitted by the master play device, and determining a second instruction processing time and a third instruction processing time based on the fast-forward or fast-reverse play instruction; and based on the modification time, synchronously pausing the playing of the target audio/video data at the second instruction processing time and synchronously playing the target audio/video data at the third instruction processing time.

In an embodiment of the present disclosure, determining the target audio/video data includes: listening on a broadcast port created by the master play device and receiving broadcast data transmitted by the master play device from the broadcast port, the broadcast data including a to-be-played audio/video name and a data size corresponding to the to-be-played audio/video name; determining to-be-played audio/video data to be the target audio/video data, when there is the to-be-played audio/video data corresponding to the to-be-played audio/video name, and a target data size corresponding to the to-be-played audio/video data is the same as the data size; receiving the target audio/video data corresponding to the broadcast data transmitted by an audio/video server in the master play device, when there is the to-be-played audio/video data corresponding to the to-be-played audio/video name and the target data size corresponding to the to-be-played audio/video data is not the same as the data size; and receiving the target audio/video data corresponding to the broadcast data transmitted by the audio/video server, when there is not the to-be-played audio/video data corresponding to the to-be-played audio/video name.

A second aspect of embodiments of the present disclosure provides a device for synchronizing audio/video, including: a first determining module, configured to determine target audio/video data, the target audio/video data being configured to be synchronously played by a master play device and a slave play device; a second determining module, configured to determine a first reception time at which a first master-to-slave signal is received and a second reception time at which a second master-to-slave signal is received, the first master-to-slave signal and the second master-to-slave signal both being transmitted by the master play device to the slave play device; a modifying module, configured to calculate a modification time based on the first reception time and the second reception time, and modify a time of the slave play device based on the modification time; and a synchronizing module, configured to synchronously change a playing status of the target audio/video data between the master play device and the slave play device based on the modification time.

A third aspect of embodiments of the present disclosure provides a device for synchronizing audio/video, including: a master play device, configured to transmit a first master-to-slave signal and a second master-to-slave signal to a slave play device; and the slave play device, configured to: determine target audio/video data, the target audio/video data being configured to be synchronously played by the master play device and the slave play device; determine a first reception time at which the first master-to-slave signal is received and a second reception time at which the second master-to-slave signal is received; calculate a modification time based on the first reception time and the second reception time, and modify a time of the slave play device based on the modification time; and synchronously change a playing status of the target audio/video data between the master play device and the slave play device based on the modification time.

A fourth aspect of embodiments of the present disclosure provides an electronic device, including: a processor; and a memory having stored thereon computer-readable instructions by the processor, and the computer-readable instructions, when being executed by the processor, implement the method for synchronizing audio/video in any of the above embodiments.

A fifth aspect of embodiments of the present disclosure provides a non-volatile computer-readable storage medium having stored thereon a computer program that, when being executed by a processor, implements the method for synchronizing audio/video in any of the above embodiments.

It should be understood that the above general description and the following detailed descriptions are exemplary and explanatory only and do not limit the embodiments of the present disclosure.

BRIEF DESCRIPTION OF THE DRAWINGS

The accompanying drawings herein are incorporated into and form a part of the specification, illustrate embodiments consistent with the present disclosure, and are used in conjunction with the specification to explain the principle of the present disclosure. Obviously, the accompanying drawings in the following description are only some of the embodiments of the present disclosure, and a person skilled in the art may obtain other accompanying drawings from these drawings without creative work.

FIG. 1 schematically illustrates a schematic flow diagram of a method for synchronizing audio/video in an embodiment of the present disclosure;

FIG. 3 schematically illustrates determining target audio/video data in a method for synchronizing audio/video in an embodiment of the present disclosure;

FIG. 4 schematically illustrates a schematic flow diagram of obtaining, by a master play device, target audio/video data in a method for synchronizing audio/video in an embodiment of the present disclosure;

FIG. 6 schematically illustrates a schematic diagram of signal transmission between a master play device and a slave play device in a method for synchronizing audio/video in an embodiment of the present disclosure;

FIG. 7 schematically illustrates a schematic flow diagram of modifying a slave play device based on a modification time in a method for synchronizing audio/video in an embodiment of the present disclosure;

FIG. 8 schematically illustrates a flow diagram of synchronously changing a playing status of target audio/video data between a master play device and a slave play device in a method for synchronizing audio/video in an embodiment of the present disclosure;

FIG. 9 schematically illustrates a schematic diagram of a first instruction processing time and a synchronization pause/play instruction in a time dimension in a method for synchronizing audio/video in an embodiment of the present disclosure;

FIG. 12 schematically illustrates a schematic flow diagram of playing, by a slave play device, target audio/video data in a method for synchronizing audio/video in an embodiment of the present disclosure;

FIG. 13 schematically illustrates a schematic flow diagram of synchronously changing a playing status of target audio/video data between a master play device and a slave

Figure 14:
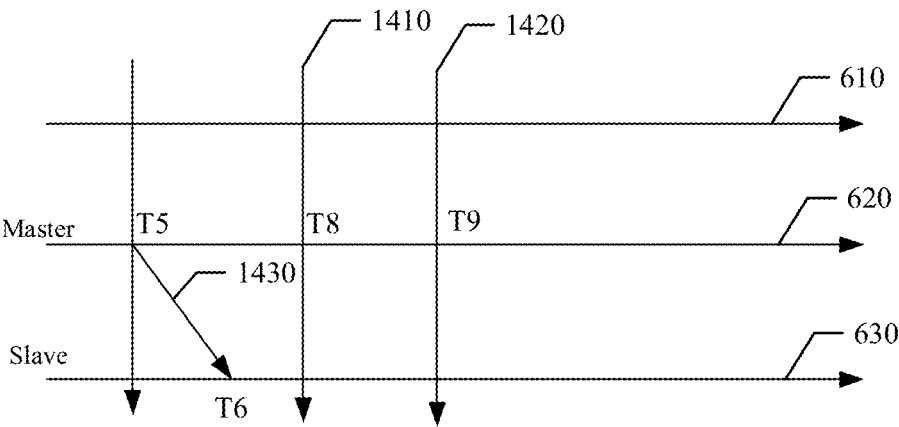
Figure 15:
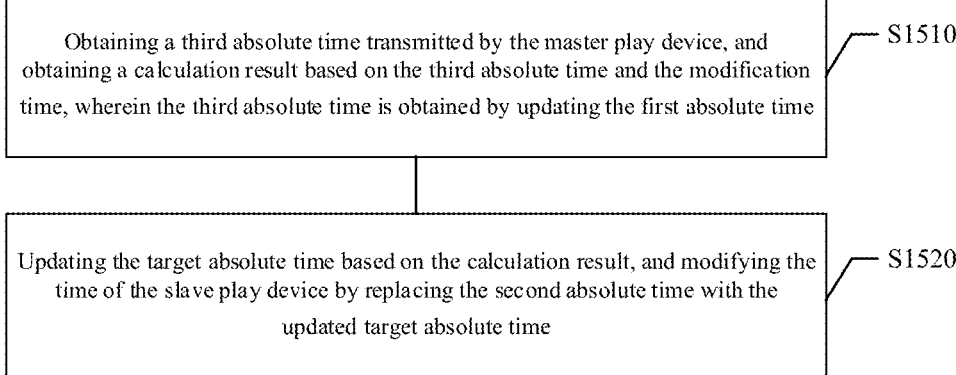
Figure 16A:
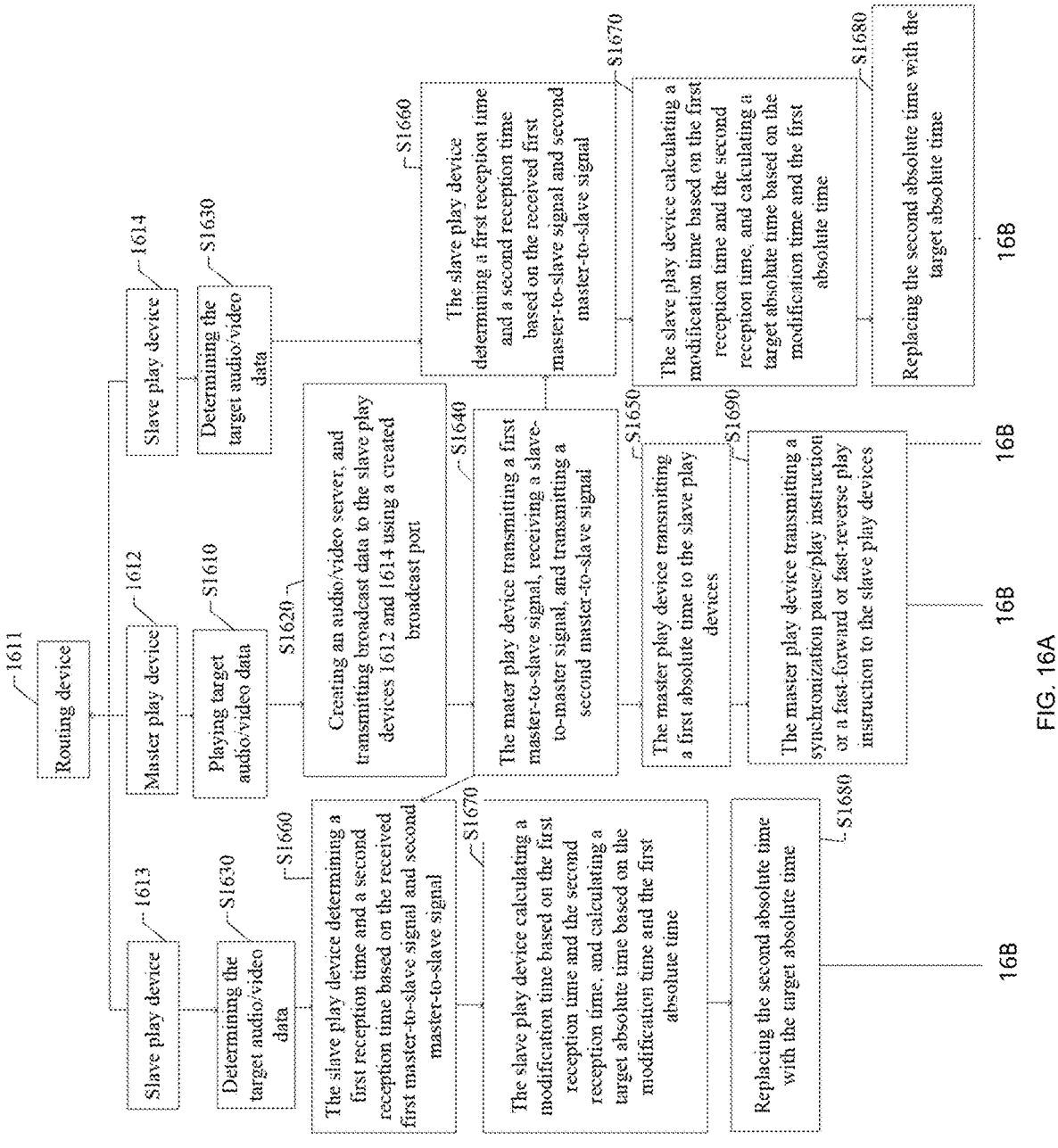
Figure 16B:
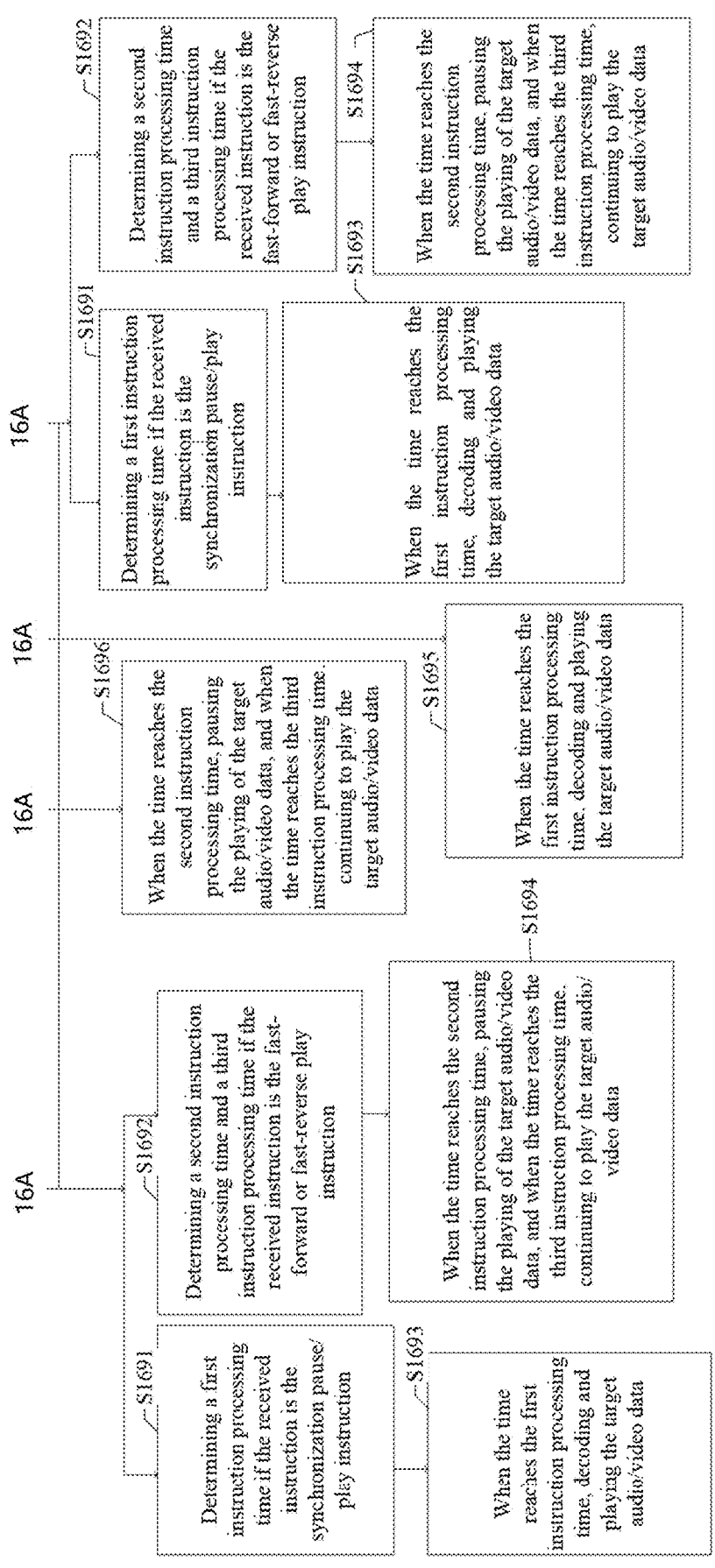
Figure 17:
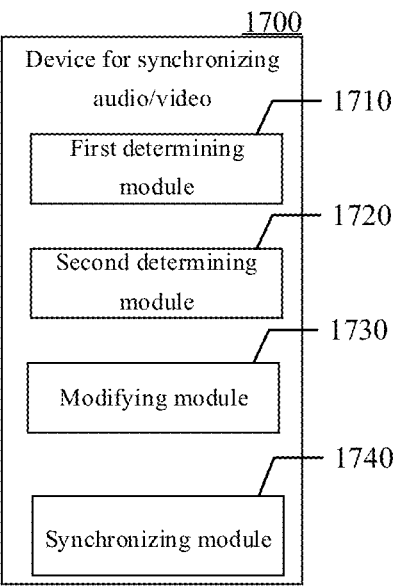
Figure 18:
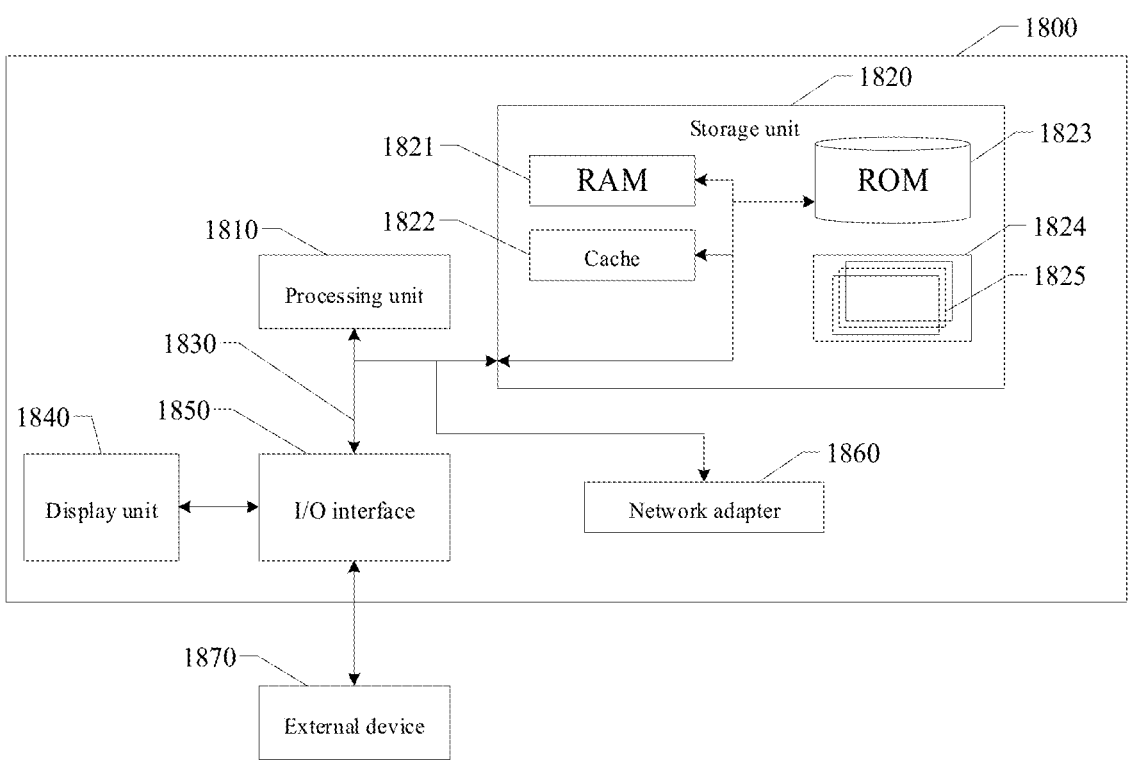
Figure 19:
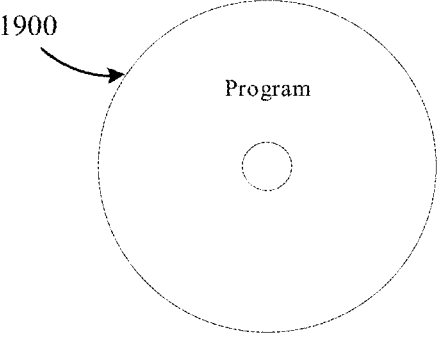

5 play device in a method for synchronizing audio/video in an embodiment of the present disclosure;

FIG. 14 schematically illustrates a schematic diagram of a second instruction processing time, a third instruction processing time, a first absolute time, and a second absolute time in a time dimension in a method for synchronizing audio/video in an embodiment of the present disclosure;

FIG. 15 schematically illustrates a schematic flow diagram after synchronously changing a playing status of target audio/video data in a method for synchronizing audio/video in an embodiment of the present disclosure;

FIGS. 16A and B schematically illustrates a schematic flow diagram in an application scenario in an embodiment of the present disclosure;

FIG. 17 schematically illustrates a schematic structure diagram of a device for synchronizing audio/video in an embodiment of the present disclosure;

FIG. 18 schematically illustrates an electronic device used for a method for synchronizing audio/video in an embodiment of the present disclosure; and FIG. 19 schematically illustrates a non-volatile computer-readable storage medium used for a method for synchronizing audio/video in an embodiment of the present disclosure.

DETAILED DESCRIPTION

Example embodiments will now be described more fully with reference to the accompanying drawings. However, the example embodiments can be implemented in a variety of forms and should not be construed as being limited to the examples set forth herein; rather, these embodiments are provided so that the present disclosure is more comprehensive and complete and the concept of the example embodiments is conveyed to a person skilled in the art in a comprehensive manner. The described features, structures, or characteristics may be combined in one or more embodiments in any suitable manner. In the following description, many specific details are provided to give a full understanding of the embodiments of the present disclosure. However, a person skilled in the art may realize that the technical solution of the present disclosure may be practiced without one or more of the particular details described, or may be practiced by employing other methods, components, devices, steps or the like. In other cases, the well-known technical solutions are not shown or described in detail to avoid overshadowing and obscuring aspects of the present disclosure.

The terms "a", "an", "the" and "said" are used in this specification to indicate the presence of one or more elements/components/etc.; the terms "including" and "having" are used to indicate open-ended inclusion and mean that there may be additional elements/components/etc. in addition to that listed; and the terms "first", "second" or the like are used only as marks without limiting the quantity of the objects thereof.

Furthermore, the accompanying drawings are only schematic illustrations of the present disclosure and are not necessarily drawn to scale. The same reference numerals in the drawings denote the same or similar parts, and thus repeated descriptions thereof will be omitted. Some of the block diagrams shown in the accompanying drawings are functional entities and do not necessarily have to correspond to physically or logically separate entities.

In view of the problem in the related art, the present disclosure provides a method for synchronizing audio/video. FIG. 1 illustrates a flow diagram of a method for synchronizing audio/video, and as shown in FIG. 1, the method for synchronizing audio/video includes at least:

step S110, determining target audio/video data, the target audio/video data being configured to be synchronously played by a master play device and a slave play device;

step S120, determining a first reception time at which a first master-to-slave signal is received and a second reception time at which a second master-to-slave signal is received, the first master-to-slave signal and the second master-to-slave signal both being transmitted by the master play device to the slave play device;

step S130, calculating a modification time based on the first reception time and the second reception time, and modifying a time of the slave play device based on the modification time; and step S140, synchronously changing a playing status of the target audio/video data between the master play device and the slave play device based on the modification time.

In the method and device provided in the embodiment of the present disclosure, on the one hand, the modification time is calculated based on the first reception time and the second reception time, and the time of the slave play device is modified based on the modification time, which realizes the time synchronization between the master play device and the slave play device; and on the other hand, based on the modification time, synchronous changing of the playing status of the target audio/video data between the master play device and the slave play device can be achieved, which avoids the case where the same audio/video cannot be played synchronously by a plurality of devices in the related art, and improves the user's experience of watching audio/video.

Various steps of the method for synchronizing audio/video are described in detail below.

In step S110, the target audio/video data is determined. The target audio/video data is configured to be synchronously played by the master play device and the slave play device.

In an embodiment of the present disclosure, the target audio/video data refers to data that needs to be synchronously played on the master play device and the slave play device. The target audio/video data includes two portions, namely, video data and audio data, as when a video picture is played, the video and audio in the video picture are usually separated to obtain the video data and the audio data, and then the video data and the audio data are transmitted to a corresponding play device to play the video picture. Correspondingly, in a subsequent process of synchronizing the video picture, the video data corresponding to the video picture needs to be synchronized, and the audio data corresponding to the video picture also needs to be synchronized.

The master play device refers to a device that may play the target audio/video data, and correspondingly, the slave play device refers to a device that may play the target audio/video data. The difference between the master play device and the slave play device is that the target audio/video data may be started to be played by a user touching a play control on the master play device, the target audio/video data played by the slave play device must be the same as that played by the master play device, and the playing of the target audio/video data by the slave play device must be synchronous with that of the master play device. It is to be noted that the master play device and the slave play device need to be in the same local area network, and the master play device and the slave play device have a play system. The play system includes a time synchronization service and an application startup service, the time synchronization service is used to subsequently synchronize the time between the master play device and the slave play device, and the application startup service is used to play the target audio/video data.

Specifically, the master play device and the slave play device may be split screens in a splicing screen. For example, the splicing screen has a first split screen, a second split screen, and a third split screen, the master play device may be the first split screen, and the slave play device may be the second split screen and the third split screen. The master play device and the slave play device may be any devices in the same local area network that can play the target audio/video data. For example, the master play device may be a play device in a security room of a shopping mall, and the slave play device may be other play devices placed at different locations in the shopping mall.

Figure 2:
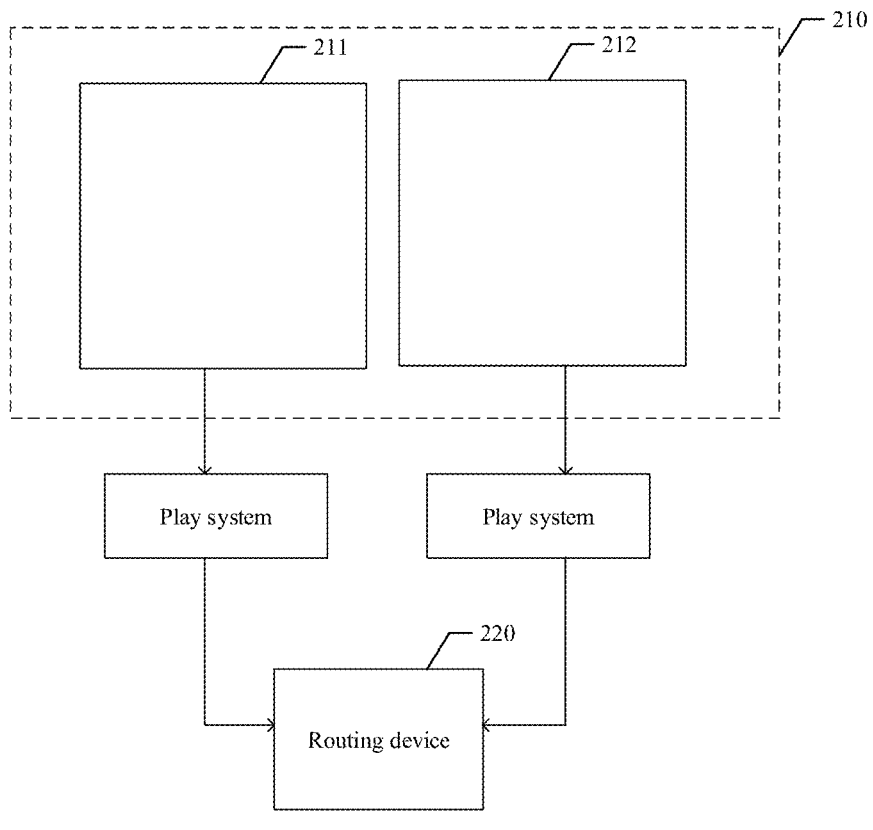
FIG. 2 schematically illustrates a schematic structure diagram of a splicing screen in an embodiment of the present disclosure.

For example, a splicing screen as shown in FIG. 2 is usually used to play a promotional video in a shopping mall. As shown in FIG. 2, the screen 210 is a splicing screen, the screen 211 is a first split screen of the splicing screen 210, the screen 212 is a second split screen of the splicing screen 210, and the device 220 is a routing device, which may be a router. The split screen 211 and the split screen 212 are connected to the router 220, and are in the same local area network. The split screen 211 is the master play device, the split screen 212 is the slave play device, and the split screen 211 and the split screen 212 both have respective play systems.

Based on this, the target audio/video data may be a promotional advertisement for the shopping mall that needs to be played synchronously on the master play device 211 and the slave play device 212.

In an optional embodiment, FIG. 3 illustrates a schematic flow diagram of determining the target audio/video data in the method for synchronizing audio/video. As shown in FIG. 3, the method includes at least: step S310, listening on a broadcast port created by the master play device and receiving broadcast data transmitted by the master play device from the broadcast port, the broadcast data including a to-be-played audio/video name and a data size corresponding to the to-be-played audio/video name.

The master play device and the slave play device are in the same local area network, specifically, the master play device and the slave play device may be connected to the same routing device at the same time so that the master play device and the slave play device are in the same local area network. The routing device may be a router or a switch, which is not specifically limited in the embodiment.

Based on this, a local area network address assigned to the master play device by the routing device, a local area network address assigned to the slave play devices by the routing device, and a broadcast address may be obtained, and the master play device needs to create the broadcast port. The broadcast port refers to a port for the master play device to communicate with all slave play devices in the same local area network as the master play device. The broadcast data refers to related data of the to-be-played audio/video which is transmitted by the master play device through the broadcast port and needs to be synchronously played by the master play device and the salve play device. It is to be noted that the broadcast data includes a to-be-played audio/video name, for example, it may be an advertisement A, and the broadcast data further includes a data size corresponding to the to-be-played audio/video name, for example, it may be 40 megabytes of the data size of the advertisement A.

For the splicing screen, each splicing screen usually has a corresponding serial number, for example, there are three splicing screens, the serial number of a first splicing screen is 11, the serial number of a second splicing screen is 12, and the serial number of a third splicing screen is 13. All of the first splicing screen, the second splicing screen, and the third splicing screen listen on the broadcast port to obtain broadcast data. If no audio/video data corresponding to the broadcast data (the to-be-played audio/video name is "Video A") is present locally in the splicing screen, the target audio/video data is obtained. It is to be noted that the target audio/video data obtained at this time is segmented audio/video data of "Video A", this is because the video picture displayed on the first splicing screen, that displayed on the second splicing screen, and that displayed on the third splicing screen combine to form the video picture of "Video A", therefore, the target audio/video data of "Video A" is segmented, and thus first segmentation data, second segmentation data, and third segmentation data are obtained. The first segmentation data is transmitted to the splicing screen with the serial number 11, the second segmentation data is transmitted to the splicing screen with the serial number 12, and the third segmentation data is transmitted to the splicing screen with the serial number 13.

For example, the play device listens on the broadcast port and receives the broadcast data from the broadcast port, and the broadcast data includes the to-be-played audio/video name, i.e., "Advertisement A", and 40 megabytes of the data size corresponding to "Advertisement A".

In step S320, if there is to-be-played audio/video data corresponding to the to-be-played audio/video name, and a target data size corresponding to the to-be-played audio/video data is the same as the data size, the to-be-played audio/video data is determined to be the target audio/video data.

If the to-be-played audio/video data corresponding to the to-be-played audio/video name is present in the slave play device, and the target data size of the to-be-played audio/video data is consistent with the data size in the broadcast data, it is proved that the target audio/video data that needs to be played synchronously is present in the slave play device, and then the slave play device determines the to-be-played audio/video data locally present therein to be the target audio/video data.

For example, the to-be-played audio/video name is "Advertisement A" with the data size of 40 megabytes, and at this time, first to-be-played audio/video data with the name "Advertisement A" having the target data size of 40 megabytes is present in the slave play device. Obviously, the first to-be-played audio/video data locally present in the slave play device is the audio/video data that needs to be played synchronously between the master play device and the slave play device. Therefore, at this time, the first to-be-played audio/video data is determined to be the target audio/video data.

In step S330, if there is the to-be-played audio/video data corresponding to the to-be-played audio/video name, and the target data size corresponding to the to-be-played audio/video data is not the same as the data size, the target audio/video data corresponding to the broadcast data transmitted by an audio/video server in the master play device is received.

If the to-be-played audio/video data corresponding to the to-be-played audio/video name is present in the slave play device, but the target data size of the to-be-played audio/video data is not consistent with the data size in the broadcast data, it is proved that the audio/video data corresponding to the broadcast data is not present in the slave play device, and then the target audio/video data corresponding to the broadcast data needs to be obtained from the audio/video server in the master play device.

For example, the to-be-played audio/video name is "Advertisement A" with the data size of 40 megabytes, and at this time, second to-be-played audio/video data with the name "Advertisement A" but having the target data size of 30 megabytes is present in the slave play device. Obviously, at this time, the audio/video data corresponding to the broadcast data is not present in the slave play device, and then the target audio/video data corresponding to the broadcast data needs to be obtained from the audio/video server in the master play device.

In step S340, if there is not the to-be-played audio/video data corresponding to the to-be-played audio/video name, the target audio/video data corresponding to the broadcast data transmitted by the audio/video server is received.

If the to-be-played audio/video data corresponding to the to-be-played audio/video name is not present in the slave play device, it is proved that the audio/video data corresponding to the broadcast data is not present in the slave play device, and then the target audio/video data corresponding to the broadcast data needs to be obtained from the audio/video server in the master play device.

For example, the to-be-played audio/video name is "Advertisement A" with the data size of 40 megabytes, and at this time, the to-be-played audio/video data with the name "Advertisement A" is not present in the slave play device. Obviously, at this time, the audio/video data corresponding to the broadcast data is not present in the slave play device, and then the target audio/video data corresponding to the broadcast data needs to be obtained from the audio/video server in the master play device.

FIG. 4 schematically illustrates a schematic flow diagram of obtaining, by the master play device, the target audio/video data. As shown in FIG. 4, in step S410, the master play device obtains the local area network address assigned by the routing device, obtains the broadcast address, and creates the broadcast port; in step S420, the target audio/video data is played; in step S430, the audio/video server is created and the broadcast data is transmitted by using the broadcast port; in step S440, a certain time period is waited for; in step S450, it is determined whether there is a connection to the audio/video server; in step S451, the target audio/video data is transmitted from the audio/video server if there is the connection to the audio/video server; and in step S452, a synchronization pause/play instruction is transmitted.

Figure 5:
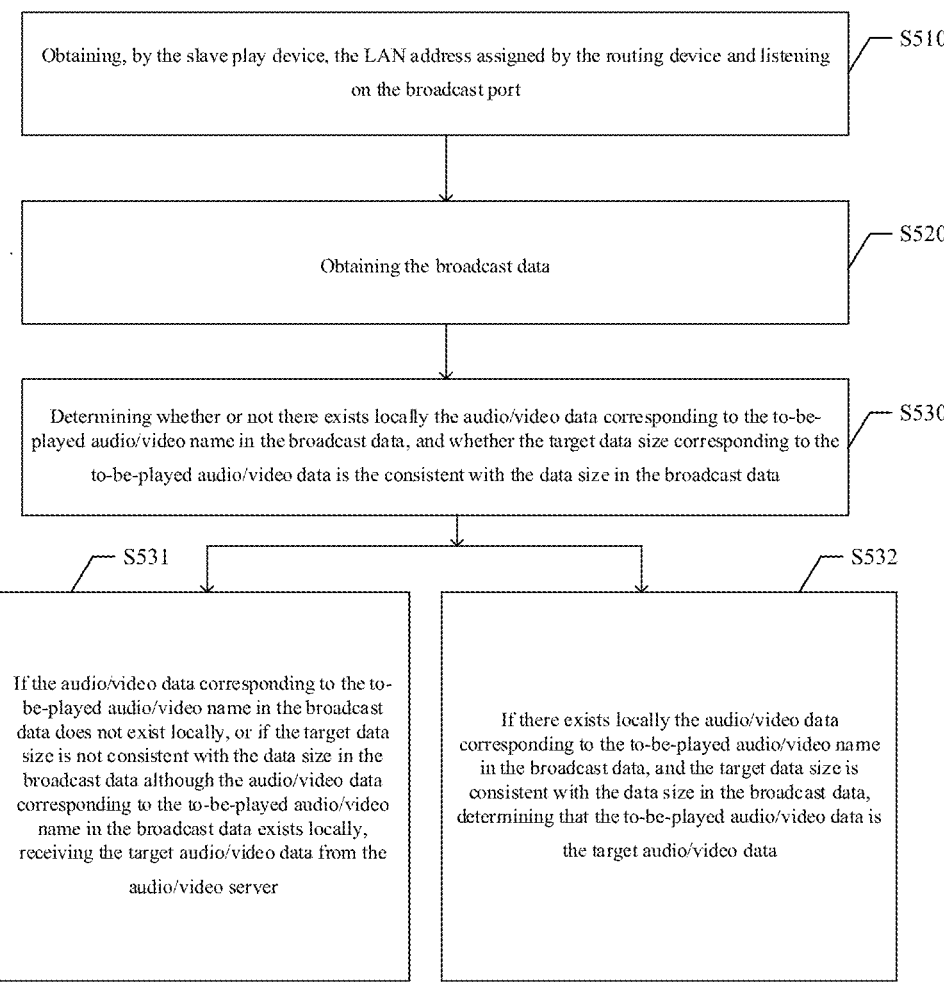
FIG. 5 schematically illustrates a schematic flow diagram of obtaining, by a slave play device, target audio/video data in a method for synchronizing audio/video in an embodiment of the present disclosure.

FIG. 5 schematically illustrates a schematic flow diagram of obtaining, by the slave play device, the target audio/video data. As shown in FIG. 5, in step S510, the slave play device obtains the local area network address assigned by the routing device and listens on the broadcast port; in step S520, the broadcast data is obtained; in step S530, it is determined whether or not there exists locally the audio/video data corresponding to the to-be-played audio/video name in the broadcast data, and whether the target data size corresponding to the to-be-played audio/video data is the consistent with the data size in the broadcast data; in step S531, if the audio/video data corresponding to the to-be-played audio/video name in the broadcast data does not exist locally, or if the target data size is not consistent with the data size in the broadcast data although the audio/video data corresponding to the to-be-played audio/video name in the broadcast data exists locally, the target audio/video data is received from the audio/video server; in step S532, if there exists locally the audio/video data corresponding to the to-be-played audio/video name in the broadcast data, and the target data size is consistent with the data size in the broadcasting data, it is determined that the to-be-played audio/video data is the target audio/video data.

In the embodiment, on the one hand, the broadcast data is the data transmitted by the master play device to the slave play devices using the broadcast port, thereby avoiding the case where the master play device needs to transmits the to-be-played audio/video name and the data size to each of the slave play devices individually in the related art, and reducing the wastage of the bandwidth; and on the other hand, the slave play device needs to determine whether there exists locally the audio/video data that is consistent with the broadcast data, which avoids the situation in which the master play device still needs to transmit the target audio/video data to the slave play device when the audio/video data exists locally in the slave play device, which improves the logic of transmitting the target audio/video data, and avoids unnecessary performance loss.

In step S120, the first reception time at which the first master-to-slave signal is received and the second reception time at which the second master-to-slave signal is received are determined. The first master-to-slave signal and the second master-to-slave signal both are transmitted by the master play device to the slave play device.

In an embodiment of the present disclosure, the first master-to-slave signal refers to a signal sent by the master play device to the slave play device, and the second master-to-slave signal refers to a signal sent by the master play device to the slave play device that is different from the first master-to-slave signal, and correspondingly, the first reception time refers to a time when the first master-to-slave signal is received from the play device, and the second reception time refers to a time when the second master-to-slave signal is received from the play device. master-to-slave signal.

By way of example, FIG. 6 schematically illustrates a schematic diagram of signal transmission between the master play device and the slave play device. As shown in FIG. 6, the abscissa 610 is an absolute time, the abscissa 620 is an absolute time of the master play device, the abscissa 630 is an absolute time of the slave play device. The absolute time of the master play device refers to a system time of the master play device, and correspondingly, the absolute time of the slave play device refers to is a system time of the play device.

The arrow 640 is the first master-to-slave signal transmitted by the master play device to the slave play device, the arrow 650 is a slave-to-master signal transmitted by the slave play device to the master play device, the arrow 660 is the second master-to-slave signal transmitted by the master play device to the slave play device, the time TO is a time at which the master play device transmits the first master-to-slave signal, the time T2 is a time at which the slave play device receives the first master-to-slave signal, and thus T2 is the first reception time, the time T3 is a time at which the master play device receives the slave-to-master signal, the time T4 is a time at which the slave play device receives the second master-to-slave signal, and thus T4 is the second reception time.

In an optional embodiment, before determining the second reception time at which the second master-to-slave signal is received, the method further includes: transmitting a slave-to-master signal to the master play device and receiving the second master-to-slave signal transmitted by the master play device to determine the second reception time at which the second master-to-slave signal is received,

11

12 wherein the slave-to-master signal is transmitted by the slave play device after receiving the first master-to-slave signal, and the second master-to-slave signal is transmitted by the master play device after receiving the slave-to-master signal.

The slave-to-master signal refers to a signal transmitted from the slave play device to the master play device. It is to be noted that the slave-to-master signal is transmitted by the slave play device after receiving the first master-to-slave signal, the master play device may transmit the second master-to-slave signal to the slave play device after receiving the slave-to-master signal, and the slave play device determines the second reception time after receiving the second master-to-slave signal.

For example, as shown in FIG. 4, after receiving the first master-to-slave signal shown by the arrow 640, the slave play device may transmits the slave-to-master signal shown by the arrow 650 to the master play device, and after receiving the slave-to-master signal shown by the arrow 650, the master play device transmits the second master-to-slave signal shown by the arrow 660 to the slave play device, and then the second reception time T4 at which the second master-to-slave signal shown by the arrow 660 is received is determined.

In the embodiment, the second reception time may be determined by the transmitting order of the first master-to-slave signal, the slave-to-master signal, and the second master-to-slave signal, which provides a basis for subsequently calculating the modification time based on the first reception time and the second reception time.

In step S130, the modification time is calculated based on the first reception time and the second reception time, and the time of the slave play device is modified based on the modification time.

In an embodiment of the present disclosure, there may be a difference between the absolute time of the master play device and the absolute time of the slave play device, which in turn leads to a failure of time synchronization between the master play device and the slave play device.

The first reception time and the second reception time may be determined by using the transmissions of the first master-to-slave signal, the slave-to-master signal, and the second master-to-slave signal shown in FIG. 6, and thus the time required for the signal to be transmitted from the slave play device to the master-play device, and then from the master play device back to the slave play device may be calculated to derive the time deviation of the slave-play device with respect to the master-play device, i.e., the modification time is calculated.

Based on this, the time synchronization between the master play device and the slave play device may be achieved by modifying the time of the slave play device based on the modification time.

By way of example, the modification time is calculated based on the first reception time T2 and the second reception time T4 shown in FIG. 6, and then the time synchronization between the master play device and the slave play device may be achieved by modifying the time of the slave play device based on the modification time.

In an optional embodiment, calculating the modification time based on the first reception time and the second reception time includes: obtaining a modification time calculation formula, and calculating the modification time based on the first reception time and the second reception time by using the modification time calculation formula.

The modification time calculation formula refers to a formula for calculating the modification time.

By way of example, the formula (1) is a modification calculation formula:

$$T_{delay} = \frac{(T4 - T2)}{2} \tag{1}$$

where T2 is the first reception time, T4 is the second reception time, and Tdelay is the modification time.

In the embodiment, a method of calculating the modification time is provided, which ensures that the modification time can be obtained, and thus the modification time can be subsequently used to modify the time of the slave play device to achieve time synchronization between the master play device and the slave play device.

In an optional embodiment, FIG. 7 schematically illustrates a schematic flow diagram of modifying the slave play device based on the modification time in the method for synchronizing audio/video. As shown in FIG. 7, the method includes at least: step S710, receiving a first absolute time transmitted by the master play device and determining a second absolute time corresponding to the slave play device.

The first absolute time refers to the system time of the master play device, and the second absolute time refers to the system time of the slave play device. It is to be noted that there is a deviation between the first absolute time and the second absolute time.

By way of example, the first absolute time received from the master play device is 2:21:43, and the determined second absolute time of the slave play device is 2:21:45.

In step S720, a target absolute time is calculated based on the first absolute time and the modification time, and the time of the slave play device is modified by replacing the second absolute time with the target absolute time.

There is a deviation between the first absolute time and the second absolute time, and the deviation is the modification time, therefore the calculation result calculated based on the first absolute time and the modification time is the accurate second absolute time. Therefore, the time correction/modification of the slave play device may be achieved by replacing the second absolute time with the target absolute time as the calculation result based on the first absolute time and the second absolute time, and thus the time synchronization between the master play device and the slave play device is achieved.

For example, the formula (2) is a formula for calculating the target absolute time:

$$Ts = Tm + Tdelay \tag{2}$$

where Ts is the target absolute time, Tm is the first absolute time, and Tdelay is the modification time, based on which the time correction/modification of the slave play device is completed by replacing the second absolute time with the target absolute time, i.e., the time synchronization between the master play device and the slave play device is achieved.

In the embodiment, a method of modifying the second absolute time is provided, which ensures the time synchronization between the master play device and the slave play device, and thus ensures that the playing status of the target audio/video data can be changed synchronously between the master play device and the slave play device in the future.

In step S140, a playing status of the target audio/video data is synchronously changed between the master play device and the slave play device based on the modification time.

In an embodiment of the present disclosure, synchronously changing the playing status of the target audio/video data may specifically refer to synchronously playing the target audio/video data, synchronously pausing the playing of the target audio/video data, synchronously fast-forwarding the target audio/video data, synchronously fast-reversing the target audio/video data, and synchronously adjusting the target audio/video data to be played at a specific play progress, which is not specifically limited in the embodiment. By way of example, on the basis of the modification time, i.e., on the basis of time synchronization between the master play device and the slave play device, the target audio/video data may be synchronously played on the master play device and the slave play device.

In an optional embodiment, FIG. 8 schematically illustrates a flow diagram of synchronously changing the playing status of target audio/video data between the master play device and the slave play device in the method for synchronizing audio/video. As shown in FIG. 8, the method includes at least: step S810, receiving a synchronization pause/play instruction transmitted by the master play device and determining a first instruction processing time corresponding to the synchronization pause/play instruction.

The synchronization pause/play instruction refers to an instruction transmitted by the master play device. The synchronization pause/play instruction may be a synchronization play instruction or a synchronization pause instruction, which is not specifically limited in the embodiment.

The first instruction processing time refers to a specific time value, which may be obtained through calculation or based on developer's experiences, which is not specifically limited in the embodiment.

Specifically, if the first instruction processing time is obtained through calculation, the specific calculation process thereof is as follows: first, a time T5 at which the master play device transmits the synchronization pause/play instruction is determined, then a reception time T6 at which the slave play device receives the synchronization pause/play instruction is determined, and then an instruction processing condition that needs to be satisfied by the first instruction processing time is determined, the instruction processing condition may be that the difference between the first instruction processing time and T6 is much greater than the difference between T6 and T5, and then the first instruction processing time is obtained based on the instruction processing condition.

If the first instruction processing time is obtained based on the experience of the developer, the first instruction processing time is usually set to a time that is greater than T6, and the difference between the first instruction processing time and T6 is usually determined to be within a time range.

By way of example, FIG. 9 schematically illustrates a schematic diagram of the first instruction processing time and the synchronization pause/play instruction in the time dimension. As shown in FIG. 9, the arrow 910 represents synchronization pause/play instruction transmitted by the master play device to the slave play device, the time T5 is a time at which the master play device transmits the synchronization pause/play instruction, the time T6 is a time at which the slave play device receives the synchronization pause/play instruction, the arrow 920 indicates the first instruction processing time, which may be a time T7 that is larger than T6 by 800 ms.

In step S820, based on the modification time and a current playing status of the target audio/video data, the playing of the target audio/video data is synchronously paused or the target audio/video data is synchronously played at the first instruction processing time.

The current playing status refers to a playing status of the target video data prior to the first instruction processing time. If the current playing status of the target audio/video data is "being played", the target audio/video data is synchronously paused at the first instruction processing time, and if the current playing status of the target audio/video data is "being paused", the target audio/video data is synchronously played at the first instruction processing time.

Figure 10:
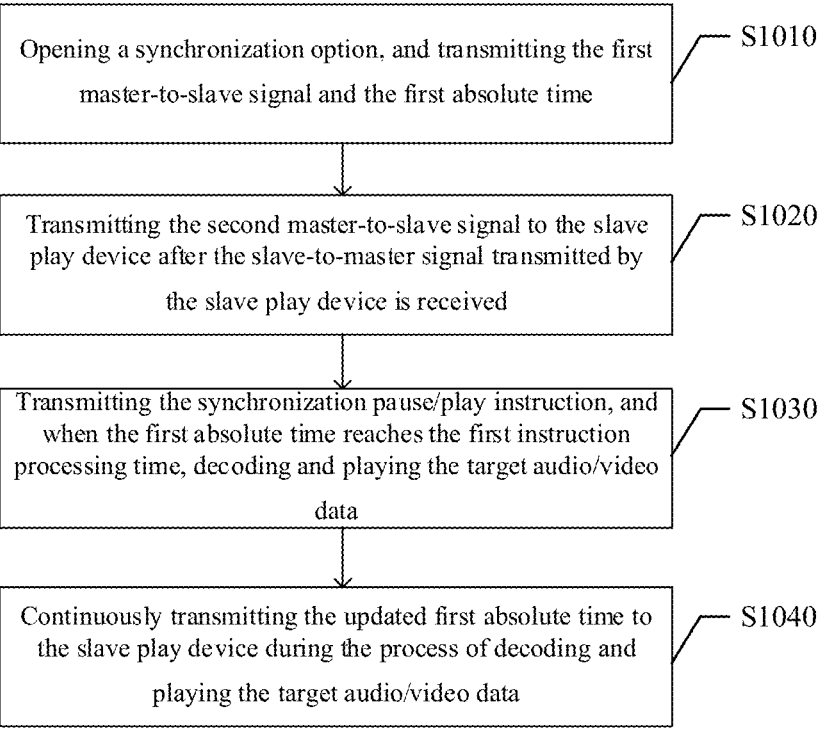
FIG. 10 schematically illustrates a schematic flow diagram of playing, by a master play device, target audio/video data in a method for synchronizing audio/video in an embodiment of the present disclosure.

FIG. 10 schematically illustrates a schematic flow diagram of playing, by the master play device, the target audio/video data. As shown in FIG. 10, in step S1010, a synchronization option is opened, and the first master-to-slave signal and the first absolute time are transmitted; in step S1020, the second master-to-slave signal is transmitted to the slave play device after the slave-to-master signal transmitted by the slave play device is received; in step S1030, the synchronization pause/play instruction is transmitted, and when the first absolute time reaches the first instruction processing time, the target audio/video data is decoded and played; and in step S1040, the updated first absolute time is continuously transmitted to the slave play device during the process of decoding and playing the target audio/video data.

Figure 11:
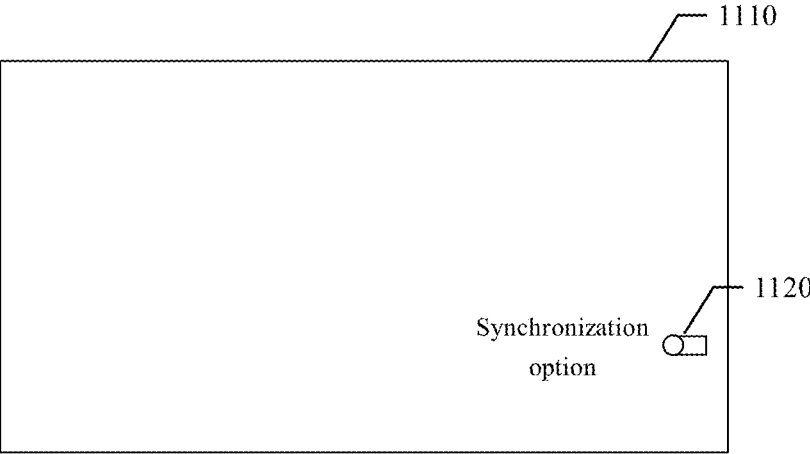
FIG. 11 schematically illustrates a schematic diagram of a picture on a display screen of a master play device in a method for synchronizing audio/video in an embodiment of the present disclosure.

FIG. 11 schematically illustrates a schematic diagram of a picture on a display screen of the master play device. As shown in FIG. 11, the interface 1110 is a display interface of the master play device, the control 1210 is a synchronization option control, and the step S1010 of FIG. 10 may be performed when a user performs a touch operation on the control 1210.

FIG. 12 schematically illustrates a schematic flow diagram of playing, by the slave play device, the target audio/video data. As shown in FIG. 12, in step S1210, the first master-to-slave signal is received, and upon receiving the first master-to-slave signal, the slave-to-master signal is transmitted to the master play device; in step S1220, the second master-to-slave signal is received, the first reception time is determined based on the first master-to-slave signal, and the second reception time is determined based on the second master-to-slave signal; in step S1230, the modification time is calculated based on the first reception time and the second reception time, and the second absolute time is updated based on the modification time; in step S1240, the target audio/video data is decoded and played at the first instruction processing time after receiving the synchronization pause/play instruction; and in step S1250, the updated first absolute time is received, and the time modification for the second absolute time is continued.

In the embodiment, by determining the first instruction processing time, it ensures that on the basis of time synchronization, the master play device and the slave play device synchronously play the target audio/video data or pause the playing of the target audio/video data at the first instruction processing time, which improves the viewing experience of the viewers.

In an optional embodiment, FIG. 13 schematically illustrates a schematic flow diagram of synchronously changing the playing status of target audio/video data between the master play device and the slave play device in the method for synchronizing audio/video. As shown in FIG. 13, the method includes at least: step S1310, receiving a fast-forward or fast-reverse play instruction transmitted by the master play device, and determining a second instruction-processing time and a third instruction-processing time based on the fast-forward or fast-reverse play instruction.

The fast-forward or fast-reverse play instruction refers to an instruction for fast-forwarding the target audio/video data to a certain play progress for playing, or an instruction for fast-reversing the target audio/video data to a certain play progress for playing, which is not specifically limited in the embodiment.

The process of determining the second instruction processing time and the process of determining the third instruction processing time are similar to the process of determining the first instruction processing time, and they may be obtained through calculations or set by the developer based on experiences thereof, which is not specifically limited in the embodiment. Each of the second instruction processing time and the third instruction processing time is a time value.

Specifically, if the second instruction processing time is obtained through calculation, the specific calculation process thereof is as follows: first, a time TO at which the master play device transmits the fast-forward or fast-reverse play instruction is determined, and then a reception time T2 at which the fast-forward or fast-reverse play instruction is received is determined by the slave play device, and then an instruction processing condition that needs to be satisfied by the second instruction processing time is determined, the instruction processing condition may be that the difference between the second instruction processing time and T2 is much greater than the difference between T2 and TO, and then the second instruction processing time is obtained based on the instruction processing condition.

Based on this, the difference between the third instruction processing time and the second instruction processing time needs to be within a certain range, for example, the difference between the third instruction processing time and the second instruction processing time needs to be greater than 500 milliseconds and less than 800 milliseconds.

If the second instruction processing time is obtained based on the experience of the developer, the second instruction processing time is typically set to be a time greater than T2, and the difference between the second instruction processing time and T2 is typically determined to be within a time range, for example, the difference between the second instruction processing time and T2 needs to be greater than 400 milliseconds and less than 900 milliseconds, based on which the third instruction processing time is determined, and the difference between the third instruction processing time and the second instruction processing time needs to be within a certain range, for example, the difference between the third instruction processing time and the second instruction processing time needs to be greater than 500 milliseconds and less than 800 milliseconds.

By way of example, the slave play device receives a synchronization fast-forward or fast-reverse instruction, and the instruction is for fast-forwarding the target audio/video data. FIG. 14 schematically illustrates a schematic diagram of the second instruction processing time, the third instruction processing time, the first absolute time, and the second absolute time in a time dimension. As shown in FIG. 14, the arrow 1410 indicates positions of the second or third instruction processing time on the coordinate axis 610, 620 and 630, specifically, the second instruction processing time or the third instruction processing time is T8, the arrow 1420 indicates positions of the second or third instruction processing time on the coordinate axis 610, 620 and 630, specifically, the second instruction processing time or the third instruction processing time is T9, the arrow 1430 indicates the fast-forward or fast-reverse play instruction transmitted by the master play device to the slave play device, the time T5 indicates the time at which the master play device transmits the fast-forward or fast-reverse play instruction, and the time T6 indicates the time at which the fast-forward or fast-reverse play instruction is received by the slave play device.

If the instruction is for fast-reversing the target audio/video data, the arrow 1410 indicates the positions of the third instruction processing time on the coordinate axis 610, 620 and 630, and the arrow 1420 indicates the positions of the second instruction processing time on the coordinate axis 610, 620 and 630.

If the instruction is for fast-forwarding the target audio/video data, the arrow 1410 indicates the positions of the second instruction processing time on the coordinate axis 620, 630 and 640, and the arrow 1420 indicates the positions of the third instruction processing time on the coordinate axis 620, 630 and 640.

In step S1320, based on the modification time, the playing of the target audio/video data is synchronously paused at the second instruction processing time, and the target audio/video data is synchronously played at the third instruction processing time.

Based on the time synchronization between the master play device and the slave play device, the playing of the target audio/video data is synchronously paused at the second instruction processing time, and then the target audio/video data is synchronously played at the third instruction processing time.

For example, the fast-forward or fast-reverse play instruction is obtained, the second instruction processing time T8 and the third instruction processing time T9 shown in FIG. 14 are determined, the master play device and the slave play device synchronously pause the playing of the target audio/video data at the time T8, and then synchronously play the target audio/video data at the time T9.

In the embodiment, a method of synchronously fast-forwarding or synchronously fast-reversing the target audio/video is provided, which improves the logic of synchronously changing the playing status of the target audio/video data.

In an optional embodiment, FIG. 15 schematically illustrates a schematic flow diagram after synchronously changing the playing status of target audio/video data in the method for synchronizing audio/video. As shown in FIG. 15, the method includes at least: step S1510, obtaining a third absolute time transmitted by the master play device, and obtaining a calculation result based on the third absolute time and the modification time, wherein the third absolute time is obtained by updating the first absolute time.

The third absolute time refers to a time obtained after updating the first absolute time. It is to be noted that the first absolute time, i.e., the system time of the master play device, may be changed in the process of synchronously playing the target audio/video data, and therefore, in order to ensure that the target audio/video data is always played synchronously between the master play device and the slave play device, it needs to obtain the third absolute time. Specifically, the third absolute time may be obtained according to a preset time interval, for example, the third absolute time is obtained according to a preset time interval of 20 milliseconds, and the calculation result is obtained on the third absolute time and the modification time, so as to modify the second absolute time in real time according to the calculation result.

For example, once the first absolute time has been updated, the updated first absolute time is obtained, i.e., the third absolute time is obtained, and then the calculation result Ts is obtained by substituting Tm in the formula (2) with the third absolute time.

In step S1520, the target absolute time is updated based on the calculation result, and the time of the slave play device is modified by replacing the second absolute time with the updated target absolute time.

The target absolute time is updated to be the calculation result and the second absolute time is replaced with the updated target absolute time to again modify the time of the slave play device.

For example, once the first absolute time has been updated, the updated first absolute time is obtained, i.e., the third absolute time is obtained, and then the calculation result Ts is obtained by substituting Tm in the formula (2) with the third absolute time.

Based on this, the second absolute time is replaced with Ts to achieves another time modification of the slave play device.

In the embodiment, with the update of the first absolute time, the second absolute time of the slave play device needs to be modified again to ensure that the target audio/video data is synchronized on the master play device and the slave play device throughout the playing of the target audio/video.

In the method and device provided in the embodiment of the present disclosure, on the one hand, the modification time is calculated based on the first reception time and the second reception time, and the time of the slave play device is modified based on the modification time, which realizes the time synchronization between the master play device and the slave play device; and on the other hand, based on the modification time, synchronous changing of the playing status of the target audio/video data between the master play device and the slave play device can be achieved, which avoids the case where the same audio/video cannot be played synchronously by a plurality of devices in the related art, and improves the user's experience of watching audio/video.

The method for synchronizing the audio/video in an embodiment of the present disclosure is described in detail below in conjunction with an application scenario.

FIGS. 16A and B schematically illustrates a schematic flow diagram in an application scenario in an embodiment of the present disclosure. As shown in FIGS. 16A and B, the device 1611 is a routing device, the device 1612 is a master play device, and the devices 1613 and 1614 are slave play devices.

In step S1610, the master play device plays target audio/video data; in step S1620, the master play device creates an audio/video server, and transmits broadcast data to the slave play devices 1612 and 1614 using a created broadcast port; in step S1630, the slave play device determines the target audio/video data; in step S1640, the mater play device respectively transmits a first master-to-slave signal to the above two slave play devices, receives a slave-to-master signal, and transmits a second master-to-slave signal; in step S1650, the master play device transmits a first absolute time to the slave play devices; in step S1660, the slave play devices determine a first reception time and a second reception time based on the received first master-to-slave signal and the second master-to-slave signal; in step S1670, the slave play devices calculate a modification time based on the first reception time and the second reception time, and calculate a target absolute time based on the modification time and the first absolute time; in step S1680, the second absolute time is replaced with the target absolute time; in step S1690, the master play device transmits a synchronization pause/play instruction or a fast-forward or fast-reverse play instruction to the slave play devices; in step S1691, a first instruction processing time is determined if the received instruction is the synchronization pause/play instruction; in step S1692, a second instruction processing time and a third instruction processing time are determined if the received instruction is the fast-forward or fast-reverse play instruction; in step S1693, when the instruction transmitted by the master play device is the synchronization pause/play instruction, the target audio/video data is played or the playing of the target audio/video data is paused at the first instruction processing time; in step S1694, when the instruction transmitted by the master play device is the fast-forward or fast-reverse play instruction, the playing of the target audio/video data is paused at the second instruction processing time, and the target audio/video data is played at the third instruction processing time; in step S1695, when the time reaches the first instruction processing time, the target audio/video data is decoded and played; and in step S1696, when the time reaches the second instruction processing time, the playing of the target audio/video data is paused, and when the time reaches the third instruction processing time, the target audio/video data is continued to be played.

In this application scenario, on the one hand, the modification time is calculated based on the first reception time and the second reception time, and the time of the slave play device is modified based on the modification time, which realizes the time synchronization between the master play device and the slave play device; and on the other hand, based on the modification time, synchronous changing of the playing status of the target audio/video data between the master play device and the slave play device can be achieved, which avoids the case where the same audio/video cannot be played synchronously by a plurality of devices in the related art, and improves the user's experience of watching audio/video.

Furthermore, an embodiment of the present disclosure provides a device for synchronizing promotional audio/video, including: a master play device, configured to transmit a first master-to-slave signal and a second master-to-slave signal to a slave play device; and the slave play device, configured to: determine target promotional audio/video data, the target promotional audio/video data being configured to be synchronously played by the master play device and the slave play device; determine a first reception time at which the first master-to-slave signal is received and a second reception time at which the second master-to-slave signal is received; calculate a modification time based on the first reception time and the second reception time, and modify a time of the slave play device based on the modification time; and synchronously change a playing status of the target audio/video data between the slave play device and the slave play device based on the modification time.

The target promotional audio/video data is the same as the target audio/video data in step S110, which may specifically be any kind of audio/video data that needs to be synchronously played by the master play device and the slave play device.

The specific details of the above-described device for synchronizing promotional audio/video have been described in detail in the corresponding method for synchronizing audio/video, and thus will not be repeated herein.

Furthermore, an embodiment of the present disclosure further provides a device for synchronizing audio/video. FIG. 17 schematically illustrates a schematic structure diagram of the device for synchronizing audio/video. As shown in FIG. 17, the device 1700 for synchronizing audio/video may include a first determining module 1710, a second determining module 1720, a modifying module 1730, and a synchronizing module 1740.

The first determining module 1710 is configured to determine target audio/video data, the target audio/video data being configured to be synchronously played by a master play device and a slave play device. The second determining module 1720 is configured to determine a first reception time at which a first master-to-slave signal is received and a second reception time at which a second master-to-slave signal is received, the first master-to-slave signal and the second master-to-slave signal both being transmitted by the master play device to the slave play device. The modifying module 1730 is configured to calculate a modification time based on the first reception time and the second reception time, and modify a time of the slave play device based on the modification time. The synchronizing module 1740 is configured to synchronously change a playing status of the target audio/video data between the master play device and the slave play device based on the modification time.

The specific details of the above-described device 1700 for synchronizing audio/video have been described in detail in the corresponding method for synchronizing audio/video, and thus will not be repeated herein.

It is to be noted that although a number of modules or units of the device 1700 for synchronizing audio/video are mentioned in the above detailed description, such division is not mandatory. Actually, according to an embodiment of the present disclosure, the features and functions of two or more modules or units described above may be specified in a single module or unit. Conversely, the feature and function of one module or unit described above may be further divided to be specified by a plurality of modules or units.

Furthermore, an embodiment of the present disclosure further provides an electronic device which implement the above-described method.

An electronic device 1800 according to such embodiment of the present disclosure is described below with reference to FIG. 18. The electronic device 1800 shown in FIG. 18 is merely an example, which does not intend to limit the function and use scope of the embodiment of the present invention.

As shown in FIG. 18, the electronic device 1800 is represented in the form of a general-purpose computing device. The components of the electronic device 1800 may include, but are not limited to: at least one processing unit 1810 as described above, at least one storage unit 1820 as described above, a bus 1830 connecting different system components including the storage unit 1820 and the processing unit 1810, and a display unit 1840.

The storage unit stores program codes, and the program codes can be executed by the processing unit 1810, causing the processing unit 1810 to perform the steps described in the above-described "exemplary methods" of this specification according to various embodiments of the present disclosure.

The storage unit 1820 may include a readable medium in the form of a volatile storage unit, such as a random access memory unit (RAM) 1821 and/or a cache memory unit 1822, and may further include a read-only memory unit (ROM) 1823.

The storage unit 1820 may also include a program/usage tool 1824 having a set (at least one) of program modules 1825, and such program modules 1825 include, but are not limited to: an operating system, one or more applications, other program modules, and program data, each of these examples or some combination thereof may contain the reality of a networked environment.

The bus 1830 may represent one or more of several types of bus structures, including a memory cell bus or memory cell controller, a peripheral bus, a graphics acceleration port, a processing unit, or a local area bus using any of a variety of bus structures.

The electronic device 1800 may also be in communication with one or more external devices 1870 (e.g., keyboards, pointing devices, Bluetooth devices, or the like), may also be in communication with one or more devices that enable a user to interact with the electronic device 1800, and/or may be in communication with any device (e.g., a router, a modem, or the like) that enables the electronic device 1800 to communicate with one or more other computing devices. Such communication may be carried out through an input/output (I/O) interface 1850. Further, the electronic device 1800 may also communicate with one or more networks (e.g., a local area network (LAN), a wide area network (WAN), and/or a public network, such as the Internet) via a network adapter 1860. As shown, the network adapter 1860 communicates with other modules of the electronic device 1800 via the bus 1830. It is to be noted that, although not shown in the figures, other hardware and/or software modules may be used in conjunction with the electronic device 1800, including, but not limited to: microcode, device drives, redundant processing units, external disk drive arrays, RAID systems, tape drives, data backup storage systems or the like.

With the above description of the embodiments, a person skilled in the art may understand that the example embodiments described herein may be implemented by software or may be implemented by software in combination with necessary hardware. Thus, the technical solution according to the embodiment of the present disclosure may be embodied in the form of a software product that may be stored in a non-volatile storage medium (which may be a CD-ROM, a USB flash drive, a mobile HDD, or the like) or on a network, and include a number of instructions to cause a computing device (which may be a personal computer, a server, a terminal device, a network device, or the like) to perform the method according to the embodiments of the present disclosure.

An embodiment of the present disclosure further provides a computer-readable storage medium having stored thereon a program product which can implement the method described above in the present specification. In some possible embodiments, various aspects of the present disclosure may also be realized in the form of a program product including program codes which, when running on a terminal device, cause the terminal device to perform the steps according to various embodiments of the present invention as described in the above-described "exemplary method" of this specification.

Referring to FIG. 19, a program product 1900 for implementing the method described above according to an embodiment of the present invention is described. The program product 1900 may employ a portable compact disc read-only memory (CD-ROM) and include program codes, and may be run on a terminal device, such as a personal computer. However, the program product of the present disclosure is not limited thereto, and in the present disclosure, the readable storage medium may be any tangible medium that contains or stores a program that can be used by or in combination with an instruction execution system, apparatus or device.

The program product may employ any combination of one or more readable media. The readable medium may be a readable signal medium or a readable storage medium. The readable storage medium may be, but is not limited to, for example a system, device, or apparatus that is electrical, magnetic, optical, electromagnetic, infrared, or semiconductor, or any combination thereof. More specific examples of readable storage media (a non-exhaustive list) include: an electrical connection having one or more wires, a portable disc, a hard disc, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof.

The computer readable signal medium may include a data signal propagated in baseband or as part of a carrier, which carries readable program codes. Such propagated data signal may take a variety of forms, including, but not limited to, electromagnetic signals, optical signals, or any suitable combination thereof. The readable signal medium may also be any readable medium other than a readable storage medium that sends, propagates, or transmits a program for use by or in conjunction with an instruction execution system, apparatus, or device.

The program code contained on the readable medium may be transmitted using any suitable medium including, but not limited to, wireless, wired, optical cable, RF, etc., or any suitable combination thereof.

The program code for performing the operations of the present disclosure may be written in any combination of one or more programming languages, and the programming languages include object-oriented programming languages such as Java, C++, or the like, and further include conventional procedural programming languages such as "C" language or the like. The program code may be executed entirely on a user computing device, partially on the user device, as a stand-alone software package, partially on the user computing device and partially on a remote computing device, or entirely on a remote computing device or server. In situations involving the remote computing device, the remote computing device may be connected to the user computing device via any kind of network, including a local area network (LAN) or a wide area network (WAN), or may be connected to an external computing device (e.g., via the Internet by using an Internet service provider).

A person skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

What is claimed is:

1. A method for synchronizing audio/video, comprising:
determining target audio/video data, the target audio/video data being configured to be synchronously played by a master play device and a slave play device;

22 determining a first reception time at which a first master-to-slave signal is received and a second reception time at which a second master-to-slave signal is received, the first master-to-slave signal and the second master-to-slave signal both being transmitted by the master play device to the slave play device;
calculating a modification time based on the first reception time and the second reception time, and modifying a time of the slave play device based on the modification time; and
synchronously changing a playing status of the target audio/video data between the master play device and the slave play device based on the modification time,
wherein determining the target audio/video data comprises:
listening on a broadcast port created by the master play device and receiving broadcast data transmitted by the master play device from the broadcast port, the broadcast data comprising a to-be-played audio/video name and a data size corresponding to the to-be-played audio/video name;
determining to-be-played audio/video data to be the target audio/video data, when there is the to-be-played audio/video data corresponding to the to-be-played audio/video name, and a target data size corresponding to the to-be-played audio/video data is the same as the data size;
receiving the target audio/video data corresponding to the broadcast data transmitted by an audio/video server in the master play device, when there is the to-be-played audio/video data corresponding to the to-be-played audio/video name and the target data size corresponding to the to-be-played audio/video data is not the same as the data size; and
receiving the target audio/video data corresponding to the broadcast data transmitted by the audio/video server, when there is not the to-be-played audio/video data corresponding to the to-be-played audio/video name.

2. The method for synchronizing audio/video according to claim 1, further comprising, before determining the second reception time at which the second master-to-slave signal is received:
transmitting a slave-to-master signal to the master play device and receiving the second master-to-slave signal transmitted by the master play device to determine the second reception time at which the second master-to-slave signal is received,
wherein the slave-to-master signal is transmitted by the slave play device after receiving the first master-to-slave signal, and the second master-to-slave signal is transmitted by the master play device after receiving the slave-to-master signal.

3. The method for synchronizing audio/video according to claim 2, wherein calculating the modification time based on the first reception time and the second reception time comprises:
obtaining a modification time calculation formula, and calculating the modification time based on the first reception time and the second reception time by using the modification time calculation formula.

4. The method for synchronizing audio/video according to claim 3, wherein modifying the time of the slave play device based on the modification time comprises:
receiving a first absolute time transmitted by the master play device and determining a second absolute time corresponding to the slave play device; and calculating a target absolute time based on the first absolute time and the modification time, and modifying the time of the slave play device by replacing the second absolute time with the target absolute time.

5. The method for synchronizing audio/video according to claim 4, wherein after synchronously changing the playing status of the target audio/video data between the master play device and the slave play device, the method further comprises:

obtaining a third absolute time transmitted by the master play device, and obtaining a calculation result based on the third absolute time and the modification time, the third absolute time being obtained by updating the first absolute time; and updating the target absolute time based on the calculation result, and modifying the time of the slave play device by replacing the second absolute time with the updated target absolute time.

6. The method for synchronizing audio/video according to claim 1, wherein synchronously changing the playing status of the target audio/video data between the master play device and the slave play device based on the modification time comprises:

receiving a synchronization pause/play instruction transmitted by the master play device and determining a first instruction processing time corresponding to the synchronization pause/play instruction; and synchronously pausing the playing of the target audio/video data or synchronously playing the target audio/video data at the first instruction processing time based on the modification time and a current playing status of the target audio/video data.

7. The method for synchronizing audio/video according to claim 1, wherein synchronously changing the playing status of the target audio/video data between the master play device and the slave play device based on the time synchronization comprises:

receiving a fast-forward or fast-reverse play instruction transmitted by the master play device, and determining a second instruction processing time and a third instruction processing time based on the fast-forward or fast-reverse play instruction; and based on the modification time, synchronously pausing the playing of the target audio/video data at the second instruction processing time and synchronously playing the target audio/video data at the third instruction processing time.

8. A device for synchronizing audio/video, comprising:
a processor; and
a memory having stored thereon executable instructions by the processor,
wherein the executable instructions, when being executed by the processor, cause the processor to implement actions comprising:

determining target audio/video data, the target audio/video data being configured to be synchronously played by a master play device and a slave play device;

determining a first reception time at which a first master-to-slave signal is received and a second reception time at which a second master-to-slave signal is received, the first master-to-slave signal and the second master-to-slave signal both being transmitted by the master play device to the slave play device;

calculating a modification time based on the first reception time and the second reception time, and modifying a time of the slave play device based on the modification time; and synchronously changing a playing status of the target audio/video data between the master play device and the slave play device based on the modification time, wherein determining the target audio/video data comprises:

listening on a broadcast port created by the master play device and receiving broadcast data transmitted by the master play device from the broadcast port, the broadcast data comprising a to-be-played audio/video name and a data size corresponding to the to-be-played audio/video name;

determining to-be-played audio/video data to be the target audio/video data, when there is the to-be-played audio/video data corresponding to the to-be-played audio/video name, and a target data size corresponding to the to-be-played audio/video data is the same as the data size;

receiving the target audio/video data corresponding to the broadcast data transmitted by an audio/video server in the master play device, when there is the to-be-played audio/video data corresponding to the to-be-played audio/video name and the target data size corresponding to the to-be-played audio/video data is not the same as the data size; and receiving the target audio/video data corresponding to the broadcast data transmitted by the audio/video server, when there is not the to-be-played audio/video data corresponding to the to-be-played audio/video name.

9. The electronic device according to claim 8, wherein the actions further comprise, before determining the second reception time at which the second master-to-slave signal is received:

transmitting a slave-to-master signal to the master play device and receiving the second master-to-slave signal transmitted by the master play device to determine the second reception time at which the second master-to-slave signal is received, wherein the slave-to-master signal is transmitted by the slave play device after receiving the first master-to-slave signal, and the second master-to-slave signal is transmitted by the master play device after receiving the slave-to-master signal.

10. The electronic device according to claim 9, wherein calculating the modification time based on the first reception time and the second reception time comprises:

obtaining a modification time calculation formula, and calculating the modification time based on the first reception time and the second reception time by using the modification time calculation formula.

11. The electronic device according to claim 10, wherein modifying the time of the slave play device based on the modification time comprises:

receiving a first absolute time transmitted by the master play device and determining a second absolute time corresponding to the slave play device; and calculating a target absolute time based on the first absolute time and the modification time, and modifying the time of the slave play device by replacing the second absolute time with the target absolute time.

12. The electronic device according to claim 11, wherein the actions further comprises, after synchronously changing the playing status of the target audio/video data between the master play device and the slave play device:

obtaining a third absolute time transmitted by the master play device, and obtaining a calculation result based on the third absolute time and the modification time, the third absolute time being obtained by updating the first absolute time; and updating the target absolute time based on the calculation result, and modifying the time of the slave play device by replacing the second absolute time with the updated target absolute time.

13. The electronic device according to claim 8, wherein synchronously changing the playing status of the target audio/video data between the master play device and the slave play device based on the modification time comprises:

receiving a synchronization pause/play instruction transmitted by the master play device and determining a first instruction processing time corresponding to the synchronization pause/play instruction; and synchronously pausing the playing of the target audio/video data or synchronously playing the target audio/video data at the first instruction processing time based on the modification time and a current playing status of the target audio/video data.

14. The electronic device according to claim 8, wherein synchronously changing the playing status of the target audio/video data between the master play device and the slave play device based on the time synchronization comprises:

receiving a fast-forward or fast-reverse play instruction transmitted by the master play device, and determining a second instruction processing time and a third instruction processing time based on the fast-forward or fast-reverse play instruction; and based on the modification time, synchronously pausing the playing of the target audio/video data at the second instruction processing time and synchronously playing the target audio/video data at the third instruction processing time.

15. A non-volatile computer-readable storage medium having stored thereon a computer program that, when being executed by a processor, implements actions comprising:

determining target audio/video data, the target audio/video data being configured to be synchronously played by a master play device and a slave play device;

determining a first reception time at which a first master-to-slave signal is received and a second reception time at which a second master-to-slave signal is received, the first master-to-slave signal and the second master-to-slave signal both being transmitted by the master play device to the slave play device;

calculating a modification time based on the first reception time and the second reception time, and modifying a time of the slave play device based on the modification time; and synchronously changing a playing status of the target audio/video data between the master play device and the slave play device based on the modification time, wherein determining the target audio/video data comprises:

listening on a broadcast port created by the master play device and receiving broadcast data transmitted by the master play device from the broadcast port, the broadcast data comprising a to-be-played audio/video name and a data size corresponding to the to-be-played audio/video name;

determining to-be-played audio/video data to be the target audio/video data, when there is the to-be-played audio/video data corresponding to the to-be-played audio/video name, and a target data size corresponding to the to-be-played audio/video data is the same as the data size;

receiving the target audio/video data corresponding to the broadcast data transmitted by an audio/video server in the master play device, when there is the to-be-played audio/video data corresponding to the to-be-played audio/video name and the target data size corresponding to the to-be-played audio/video data is not the same as the data size; and receiving the target audio/video data corresponding to the broadcast data transmitted by the audio/video server, when there is not the to-be-played audio/video data corresponding to the to-be-played audio/video name.

16. The non-volatile computer-readable storage medium according to claim 15, wherein the actions further comprise, before determining the second reception time at which the second master-to-slave signal is received:

transmitting a slave-to-master signal to the master play device and receiving the second master-to-slave signal transmitted by the master play device to determine the second reception time at which the second master-to-slave signal is received, wherein the slave-to-master signal is transmitted by the slave play device after receiving the first master-to-slave signal, and the second master-to-slave signal is transmitted by the master play device after receiving the slave-to-master signal.

17. The non-volatile computer-readable storage medium according to claim 16, wherein calculating the modification time based on the first reception time and the second reception time comprises:

obtaining a modification time calculation formula, and calculating the modification time based on the first reception time and the second reception time by using the modification time calculation formula.

18. The non-volatile computer-readable storage medium according to claim 17, wherein modifying the time of the slave play device based on the modification time comprises:

receiving a first absolute time transmitted by the master play device and determining a second absolute time corresponding to the slave play device; and calculating a target absolute time based on the first absolute time and the modification time, and modifying the time of the slave play device by replacing the second absolute time with the target absolute time.

* * * * *